United States Patent [19]
Trebillon

[11] 3,843,734
[45] Oct. 22, 1974

[54] PROCESS FOR PREPARING VINYL CHLORIDE BASED TELOMERS AND COTELOMERS OF LOW MOLECULAR WEIGHT

[75] Inventor: Emile Trebillon, Neuilly, Seine, France

[73] Assignee: Produits Chimiques Pechiney-Saint-Gobain, Neuilly-sur-Seine, France

[22] Filed: Dec. 22, 1971

[21] Appl. No.: 211,061

[30] Foreign Application Priority Data
Dec. 30, 1970 France .............................. 70.47281

[52] U.S. Cl.... 260/653.1 T, 260/410.9, 260/485 H, 260/487, 260/505 R, 260/649 R, 260/651 R, 260/658

[51] Int. Cl. ........................................... C07c 17/26
[58] Field of Search ... 260/653.1 T, 653.1 R, 658 C

[56] References Cited
UNITED STATES PATENTS

| | | | |
|---|---|---|---|
| 3,454,657 | 7/1969 | Decker et al. .................. | 260/653.1 |
| 3,641,170 | 2/1972 | Nakamaye et al. ............ | 260/648 R |
| 3,651,019 | 3/1972 | Asscher et al. ................. | 260/648 R |

*Primary Examiner*—Daniel D. Horwitz

[57] ABSTRACT

A process for preparing telomers and cotelomers containing less than 50 taxogens of which at least 30 percent are vinyl chloride by heating a mixture of the taxogen and at least one halogenated organic derivative having a mobile halogen atom in the presence of a metal selected from the group consisting of iron and copper and a polar solvent.

9 Claims, No Drawings

PROCESS FOR PREPARING VINYL CHLORIDE BASED TELOMERS AND COTELOMERS OF LOW MOLECULAR WEIGHT

This invention relates to a process for preparing telomers and cotelomers of low molecular weight, having a vinyl chloride base.

A process has previously been proposed by which mixtures of vinyl chloride and/or vinylidene chloride and monomers containing a non-chlorinated vinyl group is cotelomerized with chloroform or carbon tetrachloride as the telogen, in the presence of a ferrous or ferric compound. This process, which has the advantage over earlier processes, of avoiding the formation of volatile or heavy products, is limited to the production of cotelomers. In most instances, mixtures of cotelomers are obtained and the degree of telomerization is generally low. When this process is applied to homotelomerization, volatile products are principally obtained. In addition, the reducing agents, generally employed with the catalyst, pollute the cotelomer and their subsequent removal is difficult to achieve.

The term "telogen" is meant to refer to a halogenated organic derivative which supplies the ends or terminal groupings of the telomer chain. The term "taxogen" is meant to refer to an unsaturated compound, in other words a monomer, which supplies the links of the telomer chain. It will be understood that "taxogen" includes within its meaning two or more different monomers capable of cotelomerizing and, in this specification, the term "monomer" is used to designate vinyl chloride or other monomer capable of cotelomerizing with vinyl chloride, and the term "comonomer" is used where necessary to distinguish between vinyl chloride and the other monomer.

In accordance with the practice of this invention, a process for preparing telomers and cotelomers, containing less than 50 taxogens of which at least 30 percent are vinyl chloride, comprises heating a mixture of the taxogen and at least one telogen in the form of a halogenated organic derivative having a mobile halogen atom, in the presence of a metal selected from the group consisting of iron and copper, and a polar solvent which is at least partially miscible with the mixture of taxogen and the halogenated organic derivative.

The halogenated organic derivatives, constituting the telogen and capable of being used in the present process, are selected from the group consisting of the chlorinated, brominated, chlorobrominated, chlorofluorinated, bromofluorinated and chlorobromofluorinated derivatives of methane and ethane, isobutyl bromide, the esters of dichloroacetic and trichloroacetic acid, benzyl chloride and the chlorides of aromatic sulphonic acids.

The molar ratio of taxogen to telogen is preferably within the range of 0.5 to 300. The higher the number of links required in the resulting telomer and cotelomer, the higher must be the molar ratio of taxogen to telogen.

The molar ratio of taxogen to metal is selected to be within the range of 2,000 to 20 and it is preferably within the range of 1,000 to 75. Desirably, the metal possesses a relatively large surface area. For this purpose, use can be made of metal turnings or preferably powdered metals formed of grains of from 40 to 800 microns.

In the preferred practice of this invention, it is desirable to make use of solvent in the molar ratio of taxogen to solvent within the range of 20 to 2. The preferred solvents are alcohols, especially isopropanol and acetonitrile. The substitution of a hydrocarbon for the polar solvent reduces or cancels the yield, depending somewhat upon the taxogens used. The same is true if no solvent is present in the reaction mixture. It is preferred to avoid the presence of water since even small amounts are effective to reduce the yield.

The comonomers, that is monomers other than vinyl chloride, which may be used in the practice of this invention, are selected to have an ethylenic double bond. It is thus possible to make use of a wide variety of comonomers in which the yield varies according to the reactivity of the comonomer selected. For example, maleates give low yields, whereas vinyl chloride alone or with styrene telomerizes with yields close to 100 percent.

In carrying out the process of this invention, the constituents of the reaction mixture may be introduced in any order into an autoclave or other reaction vessel, care being exercised to avoid deposition of the metal onto a wall of the autoclave. For this reason, it is preferred that the metal be introduced into the autoclave after liquid components have been introduced, and with agitation. When an especially reactive comonomer is being employed, it is preferably introduced progressively after the other constituents.

The pressure to be maintained within the autoclave or reaction vessel is usually within the range of 1 to 20 bars, depending somewhat upon the monomers being used.

The reaction temperature is maintained within the range of 60° to 200° C, depending upon the reactivity and volatility of the monomers.

The autoclave, preferably lined internally with glass or other vitreous material or tantalum, or silver plating to prevent any pollution, should be provided with an agitator which is effective sufficiently to mix all of the reaction mixture and not to bring the solid metal phase into contact with the entire liquid phase.

By varying the composition of the mixture of monomers employed, it is possible to obtain cotelomers which are compatible with different polymers. The large proportion of chlorine introduced by the telomers and cotelomers have the effect of retarding or even preventing combustion of the plastic materials in which they have been incorporated thereby to produce a non-combustible plastic.

Having described the basic concepts of the invention, the following examples are given by way of illustration, but not by way of limitation, of the practice of this invention:

EXAMPLE 1

Use was made of a steel autoclave having a vitreous lining and provided with an internal agitator and an outer jacket for the circulation of a heat exchange fluid therethrough. Successive introductions are made into the autoclave of 385 g of carbon tetrachloride, 190 g of isopropanol, 2.24 g of iron powder (specific surface of 0.1 m$^2$/g, containing 98 percent of iron) and 772 g of liquid vinyl chloride. The mixture was heated to 95° C, while being agitated, by circulating hot oil through the outer jacket. The initial pressure, which became established in the autoclave, was 12.5 bars. An exothermic reaction took place when a temperature of 98° C was reached. The temperature was maintained for 5 hours between 90° C and 92° C by thermostatic control of the circulating oil temperature, after which the pressure fell to 5 bars. After cooling, the mixture obtained was diluted with an equal volume of methylene chloride, and then filtered to eliminate traces of solid polymers.

The filtrate was washed in a 5 percent by weight aqueous solution of hydrochloric acid until complete elimination of iron salts was obtained, washing was continued with water, and then with a 5 percent by weight solution of sodium bicarbonate. The volatile products, formed essentially of unreacted constituents of the original mixture, were eliminated in a rotating evaporator heated progressively up to 110° C under a pressure of 0.1 mm of mercury. 804 g of a highly viscous clear yellow liquid containing 66.3 percent chlorine was then obtained. The mean molecular weight in number, measured by tonometry, was 580, which corresponded to a telomer of the formula:

$$CCl_3 - (CH_2 - CHCl)_n - Cl,$$

in which n is close to 7.

EXAMPLE 2

The autoclave of Example 1 was used and the same mixture of ingredients, as in Example 1, was introduced except that the mixture did not contain isopropanol. A pressure of 13 bars was maintained for 15 hours at a temperature of 95° C, indicating that the vinyl chloride had not polymerized. 19 g of isopropanol was then introduced by means of a dosing pump. An immediate release of heat occurred and the temperature rose to 135° C. It then fell again to 95° C after 30 minutes and the pressure was then 7 bars. Heating was continued for 4½ hours. The pressure had dropped to 4.5 bars at the end of this period.

After the separation and purification steps, as described in Example 1, 825 g of a telomer, similar to that described in Example 1, was recovered.

EXAMPLE 3

A procedure similar to that described in Example 1 and employing the same apparatus was carried out with only 60 g of isopropanol and 77 g of carbon tetrachloride, the other constituents being used in the same quantities as in Example 1. Heating was carried out for 4 hours at 110° C.

557 g were obtained of a pasty mass containing 61 percent by weight chlorine and having a mean molecular weight of 1,350. This example demonstrates the possibility of regulating the molecular weight by changing the ratio of telogen to monomer.

EXAMPLE 4

In each of seven tubes of borosilicate glass there were introduced, at −70° C, 8.5 g of carbon tetrachloride, 0.1 g of iron powder and 17.3 g of vinyl chloride. To each of these mixtures was added 4.2 g of one of the following water free compounds: methanol, ethanol, isobutanol, ethyl-2-hexanol, acetonitrile and heptane.

After removing the air from the tubes by scavenging with pure dry nitrogen, the tubes were sealed. The internal vacuum of each tube was then about 60 cm³. The tubes were each introduced horizontally into a cavity having a diameter slightly larger than its own, formed in a block of aluminum fixed to a device capable of imparting to the block an agitating movement which was practically horizontal and perpendicular to the axis of the tubes.

After 10 hours at the temperatures indicated in the following Table 1, the tubes were cooled to −70° C and opened. Their contents were subjected, at room temperature, to the after-cooling treatment described in Example 1. The yields of the products recovered varied according to the solvent used but had substantially uniform chlorine content. The results of these experiments are set forth in Table 1. The zero yield, when using a polar solvent (heptane), should be noted.

TABLE 1

| Solvent | Reaction Temperature in °C | Weight of telomer obtained in g. | Physical state at 20°C | Chlorine content in % by weight |
|---|---|---|---|---|
| ethanol | 95 | 8.5 | viscous liquid | 67.8 |
| methanol | 95 | 5.6 | liquid | — |
| isobutanol | 95 | 12.3 | liquid | 67.9 |
| Ethyl-2-hexanol | 100 | 8.3 | viscous liquid | 69.0 |
| acetonitrile | 95 | 12.9 | (7.3g : liquid (5.6g : pasty | — |
| heptane | 95 | 0 | — | — |

EXAMPLE 5

This example is given by way of comparison to illustrate the adverse effect of the presence of water in the mixture.

The experiments were carried out as described in Example 4, but substituting for the various organic solvents used in Example 4, equal weights of isopropanol-water mixture.

The reaction temperature in each experiment was 95°C.

The weights of telomers obtained from these mixtures are given in the following Table II.

TABLE II

| Percentage by weight of water in mixture of water and isopropanol | Weight of telomer obtained | |
|---|---|---|
| | Liquid soluble in CCl₄ | Solid insoluble in CCl₄ |
| 0.0 | 12.5 | 1.1 |
| 0.9 | 5.3 | 2.3 |
| 5.6 | 4.8 | 6.1 |
| 25.0 | 0 | 1.3 |

As will be seen from Table II, even small amounts of water reduced the total yield and increased the relative proportion of heavy products.

EXAMPLE 6

This example is given to illustrate the effects of using different comonomers with vinyl chloride (V.C.).

The experiments with the different comonomers were carried out in the same autoclave as that described in Example 1. The constituents of the reaction mixture were all introduced at the start of each experiment, with the exception of the too-reactive comonomers which were injected progressively into the autoclave by means of the dosing pump, after the other constituents had been mixed. Vinylidene chloride was thus introduced at a rate of 58 cm³/hour and styrene at a rate of 55 g/hour. The product of the reaction was, in each instance, recovered and purified as described in Example 1. The conditions and the results are given in the following Table III.

TABLE III

| Comonomer | Monomer (weight in g) | | Reaction | | | Cotelomer obtained | | | |
|---|---|---|---|---|---|---|---|---|---|
| | Vinyl Chloride | Comono- mer | Temperature °C | Duration hours | Pressure bars | Weight in g. | Content of Cl,% | Mole- cular weight | State & appear- ance |
| Vinylidene Chloride | 723 | 90 | 95–103 | 5 | 12.3–7.8 | 632 | 70.7 | 415 | Viscous yellow liquid |
| Propylene | 469 | 210 | 91–95 | 5 | 21.3–19 | 410 | 61.9 | 440 | Viscous clear yellow liquid |
| Butene-2 | 728 | 59 | 90 | 5 | 12–5.5 | 742 | 65.9 | — | Clear yellow liquid |
| Bucyl- acrylate | 435 | 389 | 95 | 5 | — | — | 24.8 | 990 | Very viscous yellow material |
| Butyl- acrylate | 661 | 246 | 92 | 15 | — | 190 | 38.9 | — | Amber liquid |
| Styrene | 825 | 110 | 95 | 3 | 15–7 | 844 | 63.3 | — | Orange liquid |

385 g of carbon tetrachloride and 190 g of isopropanol were used in each of the experiments. 4.8 g of iron were introduced, with the exception of the experiments carried out with butylacrylate, in which this quantity was reduced by one-half. The two temperatures, given in certain cases, are the extreme temperatures recorded. The pressures given are those at the commencement and at the end of the reaction.

The composition of the cotelomer chain and its length are functions of the ratio of the constituents in the initial mixture. For example, in the experiment using propylene, the ratio of comonomers to carbon tetrachloride is about 5; three-fifths of the cotelomerized monomers are vinyl chloride. The average formula of the cotelomer is:

$$CCl_3 - (CH_2 CHCl)_{3.70} - (C_3H_6)_{1.33} - Cl$$

The first experiment with butyl acrylate gives a similar indication. The chlorine content of the cotelomer $CCl_3 - (CH_2 CHC7)_{2.9} - (C_2H_3CO_2C_4H_9)_{5.2} - Cl$ obtained in this experiment may be compared with that obtained by the experiment of Example 7.

EXAMPLE 7

This experiment illustrates the effect of the use of copper as a catalyst. Using the same autoclave as that described in Example 1, 1,078 g of carbon tetrachloride, 190 g of isopropanol, 5 g of copper powder (98.5 percent purity) and 455 g of vinyl chloride were introduced in succession. The mixture was heated, while being agitated, at 95° C for 10 hours. The pressure, initially 9.1 bars, dropped to 7 bars at the end of the reaction. The product of the reaction was cooled and then purified, as described in Example 1. 174 g of a cotelomer was obtained in the form of a very viscous yellow liquid containing 65.2 percent chlorine. The number of links in the cotelomer chain was 7, as with iron, but the yield was not as high.

EXAMPLE 8

This example and Example 9 are provided to illustrate the use of telogens other than carbon tetrachloride.

Using the same apparatus as described in Example 1, 592 g of hexachloroethane, 190 g of isopropanol, 2.4 g of iron powder and 781 g of vinyl chloride were introduced in succession. The autoclave was heated at 105° C for 12 hours. After cooling, the reaction product was recovered and purified as described in Example 1. 231 g of a dark yellow liquid, having a chlorine content of 69.8 percent was obtained.

EXAMPLE 9

Using the same apparatus as that described in Example 1, 164 g of benzyl chloride, 190 g of isopropanol, 757 g of vinyl chloride and 2.4 g of iron powder were introduced in succession. The autoclave was heated for 15 hours at 95° C. After cooling, the reaction product was recovered and purified as described in Example 1. 76 g of a very viscous brown liquid having a chlorine content of 54.7 percent was obtained.

It will be understood that changes may be made in formulation and operation without departing from the spirit of the invention, especially as defined in the following claims.

I claim:

1. A process for the preparation of telomers containing less than 50 taxogens comprising heating a mixture of vinyl chloride and at least one halogenated organic derivative selected from the group consisting of chlorinated, brominated, chlorobrominated, chlorofluorinated, bromofluorinated and chlorobromofluorinated derivatives of methane and ethane and isobutyl bromide in the presence of a metal selected from the group consisting of iron and copper and a polar solvent at least partially miscible with the mixture of the vinyl chloride and the halogenated organic derivative, said solvent being selected from the group consisting of alkanols and acetonitrile.

2. A process as claimed in claim 1 in which the molar ratio of taxogen to metal is within the range of 2,000 to 20.

3. A process as claimed in claim 1 in which the molar ratio of telogen to metal is within the range of 1,000 to 75.

4. A process as claimed in claim 1 in which the molar ratio of taxogen to halogenated organic derivative is within the range of 0.5 to 300.

5. A process as claimed in claim 1 in which the molar ratio of telogen to solvent is within the range of 20 to 2.

6. A process as claimed in claim 1 in which the solvent is isopropanol.

7. A process as claimed in claim 1 in which said mixture also includes vinylidene chloride.

8. A process as claimed in claim 1 in which said mixture also includes a compound selected from the group consisting of vinylidene chloride, propylene and butene-2.

9. A process as claimed in claim 1 wherein the solvent is selected from the group consisting of isopropanol and acetonitrile.

* * * * *